United States Patent
Macaluso

(10) Patent No.: US 7,362,146 B2
(45) Date of Patent: Apr. 22, 2008

(54) LARGE SUPPLY RANGE DIFFERENTIAL LINE DRIVER

(76) Inventor: Steven Mark Macaluso, 27 Sequioa La., Scarborough, ME (US) 04074

( * ) Notice: Subject to any disclaimer, the term of this patent is extended or adjusted under 35 U.S.C. 154(b) by 80 days.

(21) Appl. No.: 11/188,415

(22) Filed: Jul. 25, 2005

(65) Prior Publication Data
US 2007/0018695 A1    Jan. 25, 2007

(51) Int. Cl.
*H03K 3/00* (2006.01)

(52) U.S. Cl. .................... 327/108; 327/109; 327/110; 327/111; 327/112; 326/82; 326/83; 326/84; 326/85; 326/86; 326/87; 326/88; 326/89; 326/90; 326/91; 326/92

(58) Field of Classification Search .............. None
See application file for complete search history.

(56) References Cited

U.S. PATENT DOCUMENTS

| | | | |
|---|---|---|---|
| 5,248,946 A * | 9/1993 | Murakami et al. ........ 330/253 |
| 5,994,921 A | 11/1999 | Hedberg ................. 326/81 |
| 6,281,715 B1 | 8/2001 | DeClue et al. ........... 327/65 |
| 6,590,432 B1 | 7/2003 | Wu et al. ............... 327/108 |
| 6,600,346 B1 * | 7/2003 | Macaluso ............... 327/108 |
| 6,888,388 B1 * | 5/2005 | Cook et al. .............. 327/170 |
| 6,927,608 B1 * | 8/2005 | Chen et al. .............. 327/108 |
| 6,943,588 B1 * | 9/2005 | Luo et al. ............... 326/86 |
| 2004/0240135 A1 * | 12/2004 | Wong et al. ............. 361/93.1 |
| 2005/0140430 A1 | 6/2005 | Wang et al. ............. 327/543 |
| 2006/0125532 A1 * | 6/2006 | Chou .................... 327/112 |
| 2006/0125533 A1 * | 6/2006 | Kim et al. .............. 327/112 |

OTHER PUBLICATIONS

Fairchild Semiconductor Corporation's Application Note AN-5017, "LVDS Fundamentals", Dec. 2000.

* cited by examiner

*Primary Examiner*—Tuan T. Lam
*Assistant Examiner*—Hiep Nguyen
(74) *Attorney, Agent, or Firm*—Cesari & McKenna, LLP

(57) ABSTRACT

A differential transmission line driver with supplemental current sources that overcome switching anomalies and EMU issues when the logic state of the driver is switching. During a logic transition, a current source, that is directed to the output of the driver, may be prevented from delivering its current. The present invention provides a supplemental current that is active during this transition period to supply the missing current. The present disclosure also details a common mode circuit that maintains a stable common mode output level to help control EMI issues when the power supply for the driver changes.

11 Claims, 3 Drawing Sheets

LARGE SUPPLY RANGE DIFFERENTIAL LINE DRIVER

BACKGROUND OF THE INVENTION

1. Field of the Invention

The present invention relates to differential voltage line drivers, and more particularly to drivers that might see both high and low voltage differential input voltage signals (LVDS) in applications using a large range of power supply voltages.

2. Background Information

LVDS is a low voltage, low power, differential technology that has been well known in the art for a number of years. It is defined in the TIA/EIA-644 standard and is an improvement over the earlier emitter coupled (ECL) and RS 422/485 differential drivers that are also well known in the art. The improvements generally include lower power, lower differential voltage swings of about 350 mV offset at about 1.25 V. High speed operations of LVDS are surpassing the 655 Mbps of the standard as applications strive for higher and higher speeds.

FIG. 1 shows an example of a generic LVDS driver with a 3.5 mA current source being switched by an H or box switch 4 into a twisted pair cable or co-ax transmission line 6. The transmission line is terminated by a resistor R equal to the characteristic impedance of the transmission line to prevent reflections (ringing). A twisted pair cable typically has a characteristic impedance of about 100 ohm, so R would be about 100 ohms. Typical co-ax lines have impedances of 50 to 75 ohms and so R would be 50 or 75 ohms.

If the transistors are all N-type MOSFET's, and with point A high and B low, Q1 and Q4 are on and Q2 and Q3, respectively, are off. The 3.5 mA current 8 is directed through Q1, through the transmission line and the terminating resistor R and to ground through Q4 as shown. If R is 100 ohms there will be a +350 mV signal from point 10 to 12 across R and the inputs of a differential voltage receiver 14. When point B is high and A low, the current flows through Q2 and Q3, reverses through R creating a +350 mV signal from point 12 to 10. In FIG. 1, if Q2 and Q3 are on, point 10 will be about +1 volt and point 12 will be a +1.35 volts. A similar state will exist when Q4 is on where point 12 will be at +1 volt and point 10 at +1.35 volts. In short, there will be a common mode voltage at the inputs to the receiver 14 of about +1.175 volts (the 1 volt plus ½ of the 0.350 volts). In the example shown, the common mode voltage is at 1.175 V, but other levels can be designed as applications may require.

FIG. 1B illustrates a box switch but with the upper transistors being p-types MOSFET's. Similar operation in this circuit occurs except A1 and B1 signals drive devices on the same side of the box switch. When A1 is high and B1 low Q5 and Q7 are on and Q6 and Q8 are off. The circuits shown in FIGS. 1C, 1D operate in a similar fashion. FIG. 1C illustrates p-type transistors in all the box switch legs, and FIG. 1D illustrates the switch with bipolar NPN transistors. Similarly PNP transistors and combinations of NPN, PNP and even MOS transistors may be used. Other circuits with different active devices in various combinations will be known to those skilled in the art.

In FIG. 1A, if point A drives both Q2 and Q3 (similarly with B and Q1 and Q4) both on and off, the switching thresholds or the transistors and the supply voltage usually will force Q1 and Q2 to switch asymmetrically (that is not at the same input voltage level). For example, with B high and Q1 and Q4 on, the source of Q1 may be at about +1.350 V assuming there is a +1.0 V at the drain of Q4 and the 350 mA travels through an R of 100 ohms. In such a case, when point B drops, Q1 will switch off well before Q4 since the sources are at different voltage levels but they share the same gate signal. Moreover, if point A is being driven high as B is going low, Q3 will turn on before Q4 turns off and before Q2 turns on. In this state Q3 and Q4 will be on and Q1 and Q2 will be off. In such a case, both input ends of the transmission line 6 will be driven low at the same time resulting in waveform anomalies on the transmission line and a changing common mode level at the inputs to the receiver 14. Simply stated, in this example the common mode voltage at points 10 and 12 (the average of both points) will swing from 1 volts to 1.175 volts. This signal appears on both lines and may interfere with the proper receipt of the differential signal and will be a source of electromagnetic noise as described below.

Differential receiver circuits generally have very good common mode rejection ratios (CMRR). A low frequency common signal at both inputs 10 and 12 of a circuit with "good" CMRR will result in a small OUT signal compared to the OUT signal from a differential input. But, in the instance of a high frequency common mode signal, problems occur where the common mode signal may interfere with the receipt of the differential signals causing data errors, and may radiate EMI.

When the transmission line is a twisted pair carrying a differential signal, succeeding twists generate opposing electromagnetic fields that tend to cancel each other distal from the line itself. In contrast, however, a common mode signal appears on both conductors of a twisted pair and no canceling occurs. The net effect of the twist in a twisted pair is negated for common mode signal. Therefore, the electromagnetic interference generated by a common mode signal increases substantially at higher frequencies, and the industry is driving for higher and higher frequencies.

It would be advantageous to keep the common mode signal stable and unchanging.

One solution to this common mode problem is to have the switching of the driving transistors in the box circuit switch symmetrically—at the same time and at the same input voltage levels. Another approach would be to accommodate the different switching thresholds while providing means to minimize the negative effects.

Another problem occurs when the same line driver is used with high level signals and supply voltages (e.g. TTL circuits) and with LVDS signals and supply voltages. When the lower supply levels are used, there is a voltage loss through the stacked devices connecting the transmission line to the supply voltages. This reduces the available voltage drive to the line and reduces the available output voltage signal across the termination resistor. The reduced drive also reduces the frequency capability of the circuitry. This loss of capability is due, in part, to the reduced current available to drive the capacitances via the various on resistances of the devices involved. It would be advantageous to accommodate these various signal levels but minimize the negative effects.

U.S. Pat. No. 6,281,714 B1 ('715) is representative of the many patents in the general art of differential drivers. The '715 patent addresses some of the issues and problems discussed above. The '715 patent notices that at lower supply voltage, especially, the differential drivers necessarily slow down due to lack of drive current from the power supplies. This, of course, is magnified when the supply voltages are low and where thresholds, and series resistance drops in on MOSFET's, etc., limit the current available to charge capacitances during the signal transitions while driving the (low impedance) transmission line. The '715 addresses this slow down by supplying additional current drive through the box switch to the differential outputs, during the switching of the circuit from one state to another. The additional current is in parallel with the typical current source found in the prior art. The '715 patent however, by supplying current through the box switch transistors, still has limitations at low supply voltage levels due to "stacking" of the transistors—one above another wherein their voltage drops add and provide a low limit on the supply voltage.

LVDS circuits generally use +2.4 volt supply voltages and switch around +1 to about +1.4 volts. But often, LVDS drivers receive input signals generated from other logic families that use higher supply voltages and higher signal levels. For example, a TTL signal of 0 to +5V or 0 to +3.6V driving points A and B (obviously from true and not true sources) may drive a LVDS line driver.

It would be advantageous to receive signals from high level logic families, like TTL, together with signals from low logic level families, like LVDS and ECL (emitter coupled logic) and RS 422/485 circuits.

The present invention addresses problems in the prior art while providing advantages related to speed and the range of power supply voltages.

SUMMARY OF THE INVENTION

In view of the above background the present invention provides additional or supplemental currents to a differential output during the logic state transition of a differential box switch driving a differential output connected to a transmission line. A differential input signal drives the inputs of the box switch, and during the logic transition the supplemental current is added directly at the output. In this fashion, the voltage drop across the circuitry that supplies this additional current do not add to the voltage drops of the switches or other current sources.

In one preferred embodiment, series switches connect the differential input signals to the inputs of the box switch, and these switches are controlled by an enable input signal.

The inventive circuitry and process, in another preferred embodiment, also provides a stable common mode output level when the voltage of the power supply changes. A buffer amplifier receives the differential output and provides a biasing signal to one of the pull up or pull down current, wherein the implementation maintains the differential output signal at a stable common mode voltage level.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
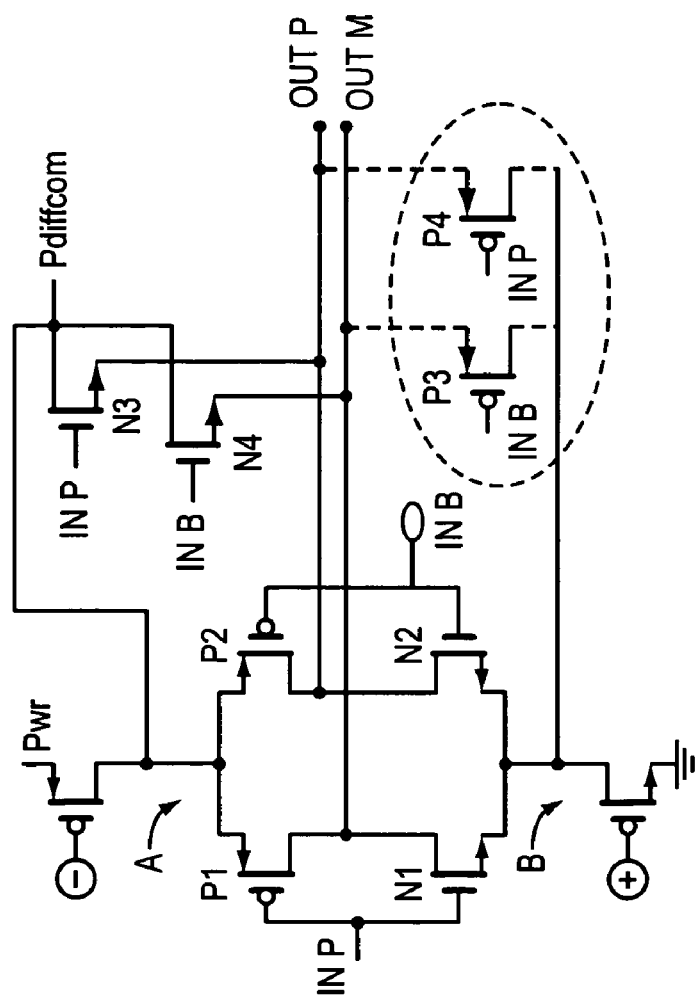
FIG. 2 is a differential driving circuit illustrating the present invention.

FIG. 2 is a circuit schematic diagram illustrating an embodiment of the present invention. For example, with either OUTP high, and OUTM low or OUTP low and OUTM high, point A may be sitting at around +1.6 V if the supply voltage is around 3.0 V. If INP and INB are switching and are both passing through +1.5 V, in oppositie directions, both P1 and P2 will be off (as in the prior art circuits) and be supplying no current to the output load. Similarly, point B may be sitting at about +0.3 V, and when both INP and INB are at +1.5 V and both N1 and N2 will be on. In this instance, the pull up transistors will supply no current to the outputs, and both pull down transistors will be on pulling both outputs low. Since no current may exist in N1 and N2, there will be no drop across these transistors, and, therefore, both may drop further. For example, OUTM is at 0.4 V and if N1 drops 0.1 V, OUTM may drop to 0.3 V when no current exists through N1.

However, N3 and N4 are added to provide a supplemental current to N1 and N2 to counter the above effect. For example, if OUTP is high and OUTM is low, then INP is high turning N1 on and P1 off, INB is low turning P2 on and N2 off. If INB rises to +1.5 V, N2 will turn on and P2 off. INP falls to +1.5 V, N1 remains on and P1 is not yet on. At this point, N1 and N2 are driving OUTM and OUTP low, respectively. INB also drives the gate of N4 and provides current driving OUTM high and countering the effect of N1 still remaining on. As INP continues going low, N1 will turn off and the final stable point of OUTM high and OUTP low will be maintained. Similarly, when the reverse occurs (INP goes high and INB goes low) N3 will provide current to drive OUTP high countering the fact that N2 remains on for a bit.

The circuit in FIG. 2 uses N3 and N4 to solve the transition issue discussed above. However, another circuit may have a different output common mode volatage that is higher than half the supply rail voltage. In such a case there may be an uncompensated pull up of both outputs when the inputs are about equal at the switching level, rather than the pull down described above. In that case P3 and P4 are source followers that may be added to provide additional pull down current to counter the problem.

Figure 1A:
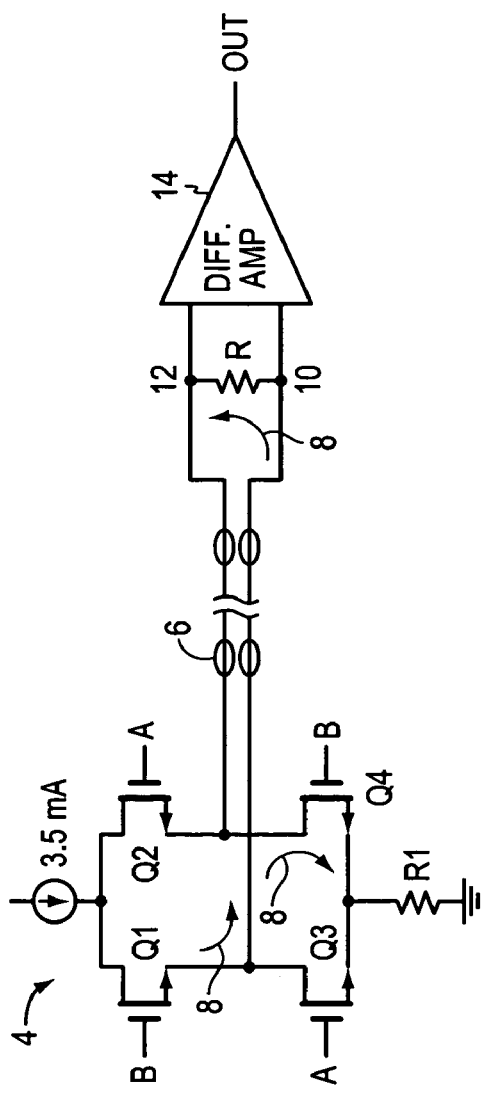
FIGS. 1A, 1B, 1C, and 1D are generic prior art differential box switch line driving circuits.
Figure 1D:
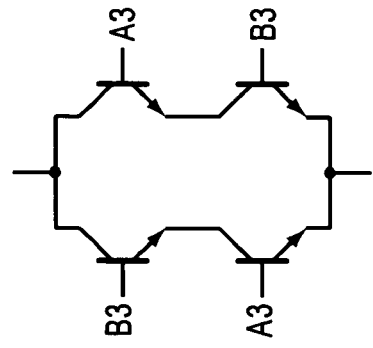
Figure 1C:
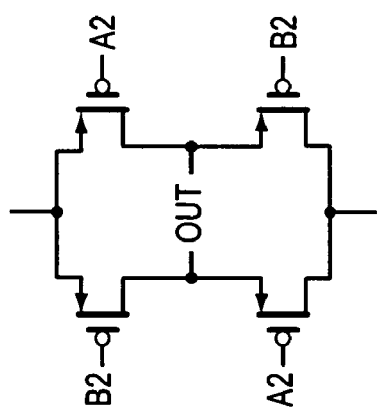
Figure 1B:
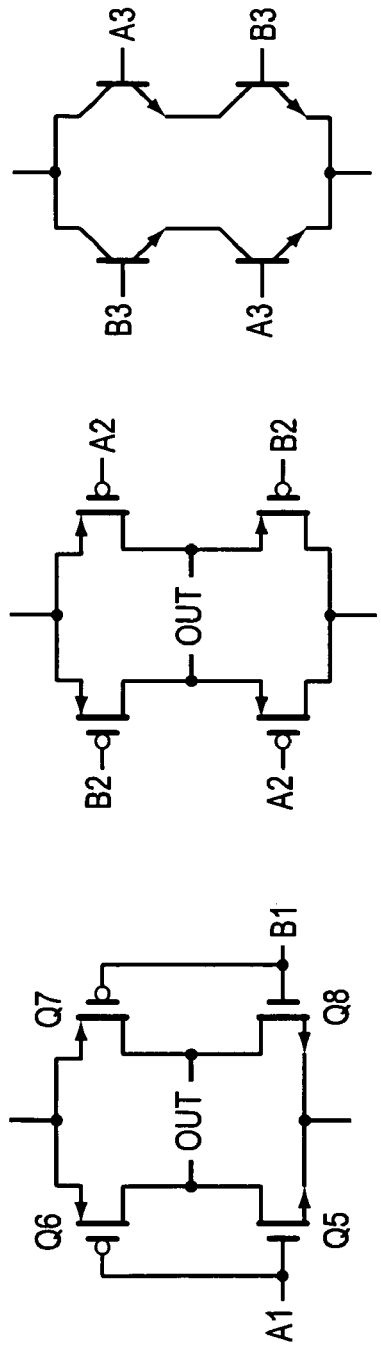
Figure 3:
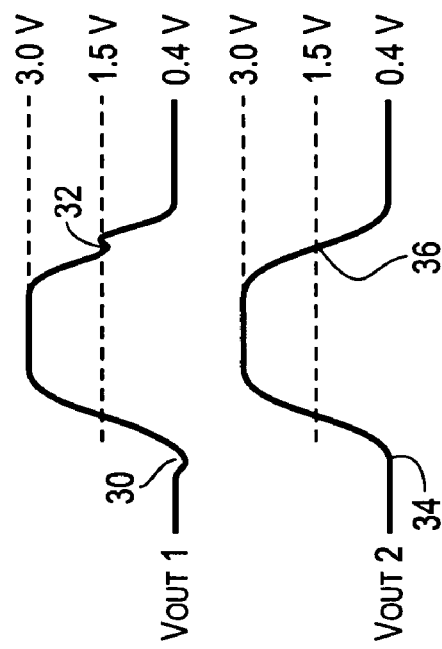
FIG. 3 is chart of waveforms illustrating the limitations of the prior art compared to the present invention.

FIG. 3 illustrates the typical output waveform of prior art box switch, VOUT1, and a box switch employing the present invention, VOUT2. VOUT1 shows the dip to about +0.3 V 30, as discussed above, and a voltage bounce 32 during logic level transitions described above. VOUT2 illustrates the same waveform with the N3 and N4 source followers supplying supplemental current to the outputs. The effect is to virtually eliminate any dips or bounces making the transitions monotonic, smooth and faster and enabling larger voltage supply ranges.

In other circuits, not shown, both NMOS and PMOS transistors may be used in combination together with bipolar transistors in both the box switch and the supplemental current sources.

An advantage of the present invention, eluded to above, is that it enhances the circuit speed of the differential drivers, and that enhanced speed is provided over a wider range of supply voltages than that of prior art line drivers. The present invention provides a current directly to the outputs and reduces the device stack between the outputs and the power supplies. This allows the present invention to provide higher currents to the outputs when using lower supply voltages, and higher currents enhance signal integrity and circuit speed.

Figure 4:
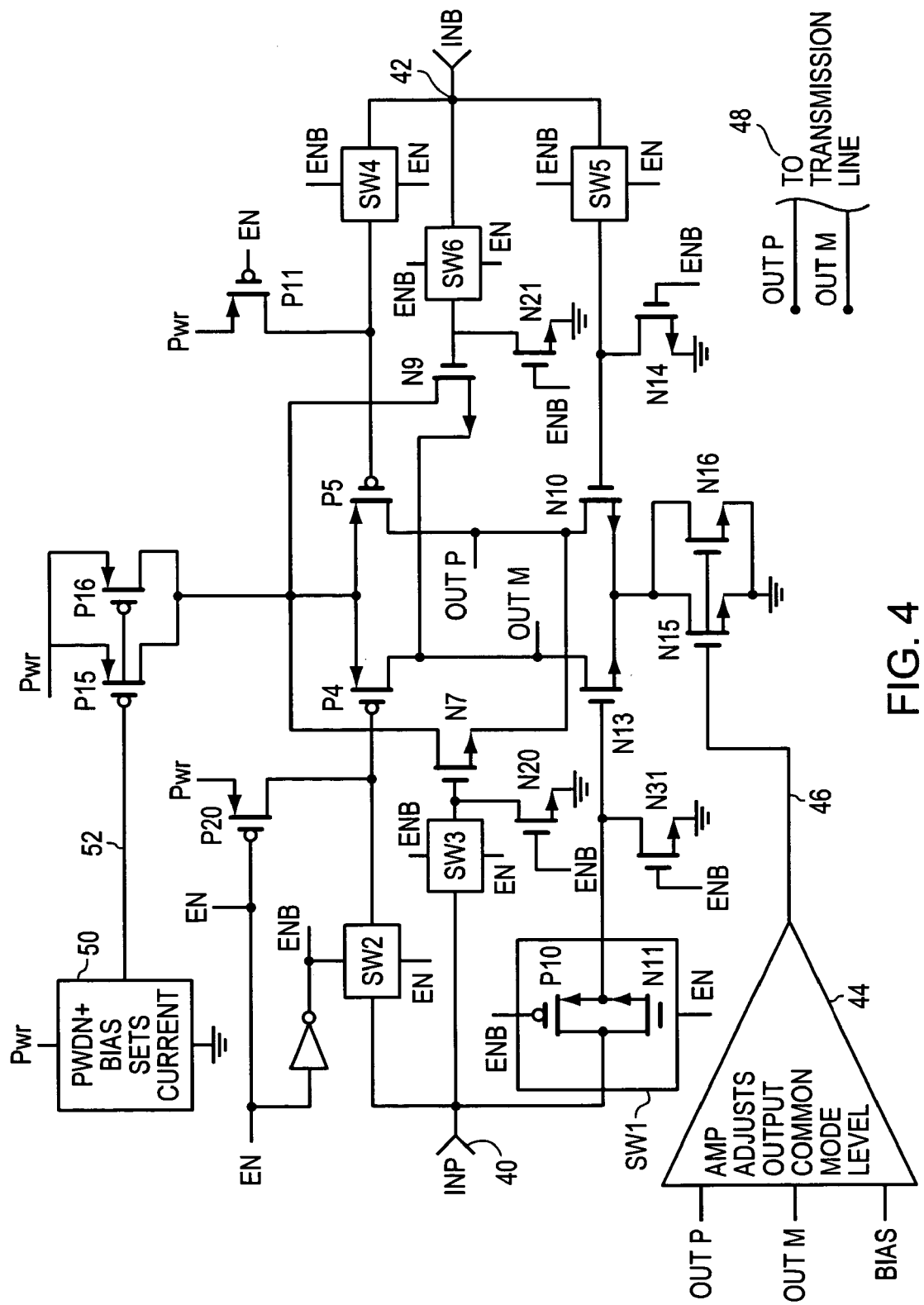
FIG. 4 is a more complete circuit diagram illustrating the present invention.

FIG. 4 is a functionally completed circuit embodiment of FIG. 2 illustrating the present invention. The box switching transistors are pull down NMOS transistors, N13, N10 and pull up PMOS transistors, P4 and P5. The supplemental currents are provided by pull up NMOS source followers, N9 and N7.

SW1 contains N11 and P10 that are parallel transistors that form a series switch. When the circuit of FIG. 4 is enabled, EN is high driving N11 on, and ENB is low driving P10 on. Both transistors provide low on series resistance and connect INP to the gate of N13. There are a number of identical switch pairs, SW2, SW3, SW4, SW5, and SW6 that, when EN is true high and ENB low, provide a low resistance path for INP and INB.

The EN and ENB are control inputs that activate and deactivate the circuit. This function was not used in the earlier circuits discussed. When disabled, EN is low biasing off N11, and ENB is high biasing off P10. In a similar fashion, all the SW's switches are biased off by EN and ENB. With all the SW's biased off, the gates of the n and p type box transistors are prevented from floating. N31 is turned on by ENB going high, and N31 drives the gate of N13 turning N13 off. Similarly, P20 is driven on by EN being low, and P20 drives the gate of box switch transistor P4 high turning P4 off. Similarly, box switch transistors N10 and P5 are driven off by N14 and P11, respectively.

Also, when the line driver of FIG. 4 is not enabled, N7 and N9, the transistors supplying the supplemental current to the outputs are disabled. N20 and N21 are turned on by the ENB being high, and they, respectively, turn off N7 and N9.

An amplifier circuit 44 receives the differential driver outputs, OUTP and OUTM, and a BIAS reference signal and outputs a controlling voltage for the common mode output signal 46. This signal 46 drives the gates of N15 and N16 to control their combined resistances. As the common mode level of OUTP and OUTM changes, the operation of the buffer 44 changes to maintain a stable common mode level at the OUTP and OUTM with changes in the power supply voltage. In a preferred embodiment, the common mode output voltage is designed to be about 1.25 V when power supply voltage is about 2.5 V.

Buffer 50 outputs a signal 52 that drives the gates of P15 and P16 to control the current source that travels through the box switch and the transmission line 48.

It should be understood that above-described embodiments are being presented herein as examples and that many variations and alternatives thereof are possible. In particular other active devices, different polarity devices and combinations thereof will be known and understood to those skilled in the art. In practice other designs may be completed that embody the present invention. Accordingly, the present invention should be viewed broadly as being defined only as set forth in the hereinafter appended claims.

What is claimed is:

1. A differential line driver comprising:
   a box switch for providing a pull up current and a pull down current to a differential output, the box switch arranged to receive a differential input signal and output a differential output signal,
   means for supplying supplemental pull up current and a pull down current to the differential output during a logic state change of the line driver when one of the pull up or pull down currents is reduced, and
   a node carrying an enable signal that is operationally connected to the line driver to enable or disable the differential line driver circuit.

2. The differential line driver circuit of claim 1 further comprising:
   series switches operationally connected between the differential inputs and corresponding inputs of the box switch, wherein the enable signal activates the series switches.

3. The differential line driver of claim 1 further comprising means for disabling the means for supplying a supplemental current.

4. The differential line driver of claim 1 further comprising:
   a supply voltage arranged to source the pull up current and sink the pull down current, wherein the supply ranges upward from 1.6 V.

5. The differential line driver of claim 1 further comprising:
   a buffer arranged to receive the differential output and provide a signal that biases one of the pull up or pull down currents in the box switch to maintain a stable common mode output level across a wide range of supply voltages.

6. A method for differentially driving a transmission line in response to a differential input signal, the method comprising:
   directing differential input signals to a box switch which is arranged to output a differential output to the transmission line,
   connecting a pull up current and a pull down current to the box switch which directs the pull up and pull down currents to a differential output,
   supplying supplemental pull up current and pull down current to the differential output when one of the pull up or pull down currents is reduced during a logic state change of the differential input and output signals, and
   enabling of the differential line driver circuit.

7. The method of claim 6 further comprising:
   operationally connecting the differential inputs to corresponding inputs of the box switch through series switches, and
   enabling the series switches.

8. The method of claim 6 further comprising disabling the supplying a supplemental currents.

9. The method of claim 6 further comprising:
   supplying a power supply to source the pull up current and sink the pull down current, wherein the power supply ranges upward from 1.6 V.

10. The method of claim 6 further comprising:
    amplifying the differential output that provides a bias signal,
    connecting that bias signal to one of the pull up or pull down currents to maintain a stable common mode output level.

11. The method of claim 6 further comprising:
    disabling the differential input signals from reaching the box switches in response to an enable signal, and
    disabling the supplemental current from reaching the differential output in response to the enable signal.

* * * * *

UNITED STATES PATENT AND TRADEMARK OFFICE
CERTIFICATE OF CORRECTION

PATENT NO. : 7,362,146 B2 Page 1 of 1
APPLICATION NO. : 11/188415
DATED : April 22, 2008
INVENTOR(S) : Steven Mark Macaluso It is certified that error appears in the above-identified patent and that said Letters Patent is hereby corrected as shown below:

On the Title Page Item (73) should read,
Assignee: Fairchild Semiconductor Corporation
82 Running Hill Road
South Portland, ME 04106

Signed and Sealed this

Fourteenth Day of October, 2008

JON W. DUDAS
*Director of the United States Patent and Trademark Office*